United States Patent
Kitajima et al.

(10) Patent No.: US 6,655,622 B2
(45) Date of Patent: Dec. 2, 2003

(54) SPINNING REEL SPOOL

(75) Inventors: Keigo Kitajima, Sakai (JP); Yoshiyuki Furomoto, Kishiwada (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/076,279

(22) Filed: Feb. 19, 2002

(65) Prior Publication Data

US 2002/0117570 A1 Aug. 29, 2002

(30) Foreign Application Priority Data

Feb. 23, 2001 (JP) .......................................... 2001-047635
Mar. 7, 2001 (JP) .......................................... 2001-063350

(51) Int. Cl.[7] ............................................. A01K 89/015
(52) U.S. Cl. ....................................... 242/322; 242/319
(58) Field of Search ................................. 242/322, 321, 242/319, 224

(56) References Cited

U.S. PATENT DOCUMENTS

| | | | | |
|---|---|---|---|---|
| 4,535,953 A | * | 8/1985 | Omori | 242/318 |
| 5,149,008 A | * | 9/1992 | Oi | 242/246 |
| 5,333,813 A | | 8/1994 | Hirano | |
| 5,456,418 A | * | 10/1995 | Hitomi | 242/322 |
| 5,603,465 A | * | 2/1997 | Henriksson | 242/246 |
| 5,947,400 A | * | 9/1999 | Tsutsumi | 242/322 |
| 6,176,446 B1 | * | 1/2001 | Sato | 242/319 |
| 6,457,662 B1 | * | 10/2002 | Sato | 242/247 |
| 2001/0002684 A1 | * | 6/2001 | Hitomi et al. | 242/322 |
| 2002/0053618 A1 | * | 5/2002 | Ochiai | 242/323 |
| 2002/0162910 A1 | * | 11/2002 | Hitomi | 242/322 |

FOREIGN PATENT DOCUMENTS

| | | |
|---|---|---|
| EP | 1108355 A1 | 6/2001 |
| FR | 2605846 A1 | 5/1988 |

* cited by examiner

*Primary Examiner*—Kathy Matecki
*Assistant Examiner*—Evan Langdon
(74) *Attorney, Agent, or Firm*—Shinjyu Global IP Counselors, LLP.

(57) ABSTRACT

Spinning-reel spool, which reciprocates back-and-forth with respect to reel unit, is furnished with bobbin trunk, inner barrel member, front flange, and skirt. Bobbin trunk, outer-circumferentially onto which fishing line is wound, is formed from sheet metal. Inner barrel member is installed on the inner circumferential side of bobbin trunk. Inner barrel member has a male-threaded portion on its rear end. Front flange is provided on bobbin trunk, and is coupled to inner barrel member via the male-threaded portion. Skirt is provided on the rear end of bobbin trunk. Skirt has a larger diameter than that of bobbin trunk.

20 Claims, 9 Drawing Sheets

SPINNING REEL SPOOL

BACKGROUND OF THE INVENTION

1. Field of the Invention

This present invention generally relates to spools. More specifically, the present invention relates to spinning-reel spool that is movable back and forth with respect to the reel unit.

2. Background Information

Spinning reels are in general furnished with a reel unit rotatively carrying a handle, a rotor, and a spool. The spinning-reel spool is movable back and forth with respect to the reel unit, and is furnished: with a fishing-line winding bobbin trunk; a front flange disposed on the front end of the bobbin trunk and having a larger outer diameter than the outer diameter of the bobbin trunk; and a cylindrical skirt provided rearward on the bobbin trunk. The fishing line scraping on the front flange easily scratches the front flange. Therefore, the front flange is often made as a separate member from the bobbin trunk.

Wherein a front flange is to be fixed to the bobbin trunk, conventionally it has been fastened using a flange-fastening member. Fastening is done, for example, by fixing the flange-fastening member to the bobbin trunk by means of bolts and sandwiching the front flange in between the bobbin trunk and the flange-fastening member.

Spools whose bobbin trunk is formed from, e.g., an aluminum-alloy sheet metal, in order to devise an overall lighter weight spool, are known among the spools of this sort.

The bobbin trunk in the foregoing conventional spool formed from sheet metal is fashioned to have thin thickness, and therefore the strength of the bobbin trunk is liable to deteriorate. That being the case, in order to heighten the strength of the bobbin trunk, thought has been given to installing an inner drum member made of a synthetic resin on the inner peripheral side of the bobbin trunk. It is conceivable in this case to fasten the flange-fastening member to the inner drum member, by fixing with bolts, such that the front flange is sandwiched between the bolts and the inner drum member.

Nevertheless, with a structure in which a plurality of screw-holes are formed in the inner drum member, and bolts passing through the flange-fastening member are screwed into the screw-holes-particularly in deep-channel spools whose front flange is large in outer diameter with respect to the diameter of the bobbin trunk—if screw-holes are to be formed in the front-end face of the inner drum member, the inner diameter of the inner drum member will be smaller. In spools fitted with a drag mechanism and spool-detaching/reattaching mechanisms, the interior space for accommodating these mechanisms will therefore be small, making it harder to accommodate these mechanisms. Likewise, as to the drag mechanism, the surface area of its disk elements will be made smaller, making it harder to obtain stronger drag force.

In view of the above, there exists a need for a spinning-reel spool which overcomes the above mentioned problems in the prior art. This invention addresses this need in the prior art as well as other needs, which will become apparent to those skilled in the art from this disclosure.

SUMMARY OF THE INVENTION

An object of the present invention is to provide a spinning-reel spool that is light in weight while securing sufficient interior space in the spool.

According to a first aspect of the present invention, a spinning-reel spool that can be shifted back and forth with respect to the reel body includes: a bobbin trunk, an inner barrel member, a front flange, and a skirt. The bobbin trunk, outer circumferentially onto which fishing line is wound, is formed from sheet metal. The inner barrel member is installed inner-peripherally along the bobbin trunk, and has a male-threaded portion on its front end or rear end. The front flange is provided on the front end of the bobbin trunk and affixed to the inner barrel member using the male-threaded portion. The skirt is of diameter larger than the bobbin trunk, and is provided on the rear end of the bobbin trunk.

As for the bobbin trunk in this spool, an inner barrel member is installed along the inner-peripheral side of the sheet-metal-manufactured bobbin trunk, and a front flange is fastened to the inner barrel member using a male-threaded portion provided on the front or rear end of the inner barrel member. Wherein the male-threaded portion is provided on the front end of the inner barrel member, the front flange may be fastened there by screwing on a flange-fastening member, or else the front flange may be fastened to the inner barrel member by screw-joining the front flange itself onto the male-threaded portion. Wherein the male-threaded portion is provided on the rear end of the inner barrel member, a brim may be formed on the front-end outer peripheral face of the inner barrel member; and a nut member may be screw-joined onto the male-threaded portion with the front flange sandwiched in between the bobbin-trunk fore end and the brim, to press the bobbin trunk frontward and fasten the front flange. In whichever case, the front flange may be simply fastened using the male-threaded portion. Herein, the fact that the male-threaded portion is formed on the inner barrel member installed along the inner periphery of the sheet-metal-manufactured bobbin trunk, and the front flange is fastened using the male-threaded portion makes it so that the spool may be devised lightened in weight while securing sufficient interior space.

According to a second aspect of the present invention, in a spool as in the first aspect, the male-threaded portion is formed on the rear end of the inner barrel member so as to project rearward beyond the bobbin trunk. In situations where a drag mechanism is to be accommodated in the front portion of the inner barrel member, the fact in this case that the male-threaded portion is formed on the rear end of the inner barrel member lets sufficient interior space be secured for accommodating the drag mechanism.

According to a third aspect of the present invention, a spool as in the second aspect, the skirt is formed integrally with the bobbin trunk by press-working the sheet metal, and has a rear flange extending peripherally outward on the rear of the bobbin trunk, and a round cylindrical portion extending rearward from the rear flange on its outer periphery; the inner barrel member on its fore end has a large-diameter brim to enable locking the front flange portion; and the front flange has a through-hole through which the inner barrel member outer circumferential surface excluding the brim is passable; and further includes a nut member having a female-threaded portion for screw-joining onto the male-threaded portion, and disposed against the rear flange for vising the front flange between the brim and bobbin trunk by screw-joining the female-threaded portion onto the male-threaded portion. In this case, after the front flange is fitted on the outer periphery of the inner barrel member and abutted on the brim, the bobbin trunk is fitted onto the inner barrel member, sandwiching the front flange between the bobbin-trunk fore end and the brim. In this situation, by screw-joining the nut member onto the male-threaded portion projecting rearward from the rear flange on the skirt, the bobbin trunk via the rear flange is pressed forward to fasten the front flange. Herein, because the nut member fastens the front flange from the rear, the fastening structure on the spool front, which is exposed to the exterior, is not exposed. The appearance of the spool therefore takes on a sharp outward look, and meanwhile fishing line is unlikely to snarl at the spool front.

According to a fourth aspect of the present invention, in a spool as in the third aspect, the nut member is made of synthetic resin. This condition maintains the corrosion resistance of the spool and serves to make it lighter weight.

According to a fifth aspect of the present invention, in a spool as in the first aspect, the male-threaded portion is formed on a radially inner periphery relative to the front end of the inner barrel member, so as to project frontward beyond the bobbin trunk. The fact that the male-threaded portion in this case is provided on the front end of the inner barrel member lets the front flange-which is situated on the front end of the inner barrel member-be readily fastened.

According to a sixth aspect of the present invention, in a spool as in the fifth aspect, the bobbin trunk has a cylindrical portion, and an inner flange portion formed integrally with the cylindrical portion and extending radially inward along the front end of the inner barrel member. In this case, the fact that an inner flange is formed extending radially inward along the front end of the cylindrical portion lets high strength be sustained in the bobbin trunk. Moreover, the inner barrel member reinforces the inner periphery of the cylindrical portion. This controls deformation of the spool even if a strong pressing force acts on the bobbin trunk, which accordingly prevents the line-intrusion due to spool deformation.

According to a seventh aspect of the present invention, in a spool as in the fifth or sixth aspect, the front flange has a first female-threaded portion for screw-joining onto the male-threaded portion, and is affixed to the inner barrel member by screw-joining a first female-threaded portion to the male-threaded portion. In this case, the fact that the front flange is screw-joined directly onto the male-threaded portion makes the front-flange fastening structure simpler.

According to an eighth aspect of the present invention, in a spool as in the seventh aspect, further including a flange-fastening member disposed at the front of the front flange and having a second female-threaded portion for screw-joining onto the male-threaded portion; wherein the front flange is stopped against turning by screw-joining the second female-threaded portion onto the male-threaded portion. In this case, the flange-fastening member can be fastened, and looseness in the front flange stopped, simultaneously by screw-joining the second female-threaded portion of the flange-fastening member onto the male-threaded portion.

According to a ninth aspect of the present invention, in a spool as in the seventh or eighth aspect, by screw-joining the first female-threaded portion onto the male-threaded portion, the front flange, between it and the inner barrel member, sandwiches the inner flange portion and fastens the bobbin trunk to the inner barrel member. In this case, fastening of the bobbin trunk may be realized by means of the front flange, which simplifies the structure for fastening the bobbin trunk.

According to a tenth aspect of the present invention, in a spool as in the fifth or sixth aspect, further including— wherein the front flange has a through-hole for passing the male-threaded portion—a flange-fastening member having a female-threaded portion for screw-joining onto the male-threaded portion; wherein by screw-joining the female-threaded portion onto the male-threaded portion the flange-fastening member sandwiches the front flange portion between and fastens it to the inner barrel member. In this case the front flange itself is not screw-joined onto the male-threaded portion, but by screw-joining the flange-fastening member onto the male-threaded portion, the front flange is sandwiched between the flange-fastening member and the inner barrel member, and fastened. The front flange therefore may be located freely into position in the circumferential direction.

According to an eleventh aspect of the present invention, in a spool as in any of the sixth through tenth aspects, the front flange has an annular groove formed opposing the inner flange portion, and the inner flange portion is inserted into the annular groove. In this case, inserting the inner flange portion into the annular groove restrains the inner flange portion from shifting radially outward, which therefore fortifies the strength of the bobbin trunk.

According to a twelfth aspect of the present invention, in a spool as in the eleventh aspect, an annular protrusion is formed on the part of the inner barrel member where the inner flange portion is disposed, projecting frontward beyond the rest; and the annular protrusion is inserted into the annular groove. The inner barrel member in this case is also inserted into the annular groove and thereby reinforced, which further heightens the strength of the bobbin-trunk front end, and makes it unlikely to deform, making line-gnawing occurrences unlikely.

According to a thirteenth aspect of the present invention, in a spool as in any of the first through twelfth aspects, the inner barrel member is made of synthetic resin. In this case, the spool may be formed at low cost while being made lightweight overall.

According to a fourteenth aspect of the present invention, in a spool as in any of the fifth through thirteenth aspects, the bobbin trunk portion is formed integrally with the skirt portion by press-working the sheet metal. In this case, a spool overall lightened in weight may be devised by a pressing process such as drawing.

According to a fifteenth aspect of the present invention, in a spool as in any the first through fourteenth aspects, further including a line-intrusion prevention member, fitted in the gap where the joining surfaces of the bobbin trunk portion and the front flange portion are outwardly exposed.

In this case, the line-intrusion prevention member in the spool as such is installed in the gap where the joining surfaces of the bobbin trunk portion and the front flange portion are outwardly exposed. Therefore, owing to the line-intrusion prevention member, because a gap is not created in between the bobbin trunk portion and the front flange, intrusion of the fishing-line may be prevented. Likewise, the line-intrusion prevention member being provided in between the front flange and the bobbin trunk portion makes it unnecessary to fabricate the sections for the fit between the bobbin trunk portion and the front flange with a high degree of precision, and therefore the two may be formed readily and at low cost.

According to a sixteenth aspect of the present invention, in a spool as in the fifteenth aspect, the line-intrusion prevention member is a ring element manufactured of a synthetic resin. In this case, by utilizing for example a synthetic resin having elasticity, though manufacturing discrepancies to some extent may arise in the bobbin trunk portion and front flange, the line-intrusion prevention member will easily absorb the discrepancies.

According to an seventeenth aspect of the present invention, in a spool as in the fifteenth through sixteenth aspects, the front flange has a crook portion bent over to the bobbin trunk portion; and the line-intrusion prevention member is installed in between the outer circumferential surface of the bobbin trunk portion and the inner periphery of the crook portion. In this case, the front flange is formed, by a spinning process for example, into a contour in which it is crooked over to the bobbin trunk portion, i.e., toward the rear. Herein, by providing the line-intrusion prevention member in the gap in between the inner periphery of the crook portion, where it is comparatively hard to produce precision, and the circumferential surface of the bobbin trunk portion, seizing of the fishing line may reliably be prevented.

According to a eighteenth aspect of the present invention, a spool as in the seventeenth aspect, the line-intrusion prevention member is formed in a contour for smoothly connecting the rear surface of the crook portion and the outer circumferential surface of the bobbin trunk portion. In this case, the fact that the line-intrusion prevention member, and the bobbin trunk portion and crook-portion rear face are smoothly connected without a gap forming in between lets seizing of the fishing line be further prevented.

According to a nineteenth aspect of the present invention, in a spool as in any the fifteenth through eighteenth aspects, the bobbin trunk portion has an inner flange portion formed integrally with the cylindrical portion and extending radially inward along the front end of said inner barrel member, and the line-intrusion prevention member is installed in between the front flange and the inner flange portion. In this case, while an inner flange is provided to maintain high strength in the bobbin trunk portion, line-intrusion between the front flange and the inner flange portion may be reliably prevented.

According to a twentieth aspect of the present invention, a spool as in the third aspect further includes a fishing line lock for locking an end of the fishing line held between the rear flange portion and the nut member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

First Embodiment

Figure 1:
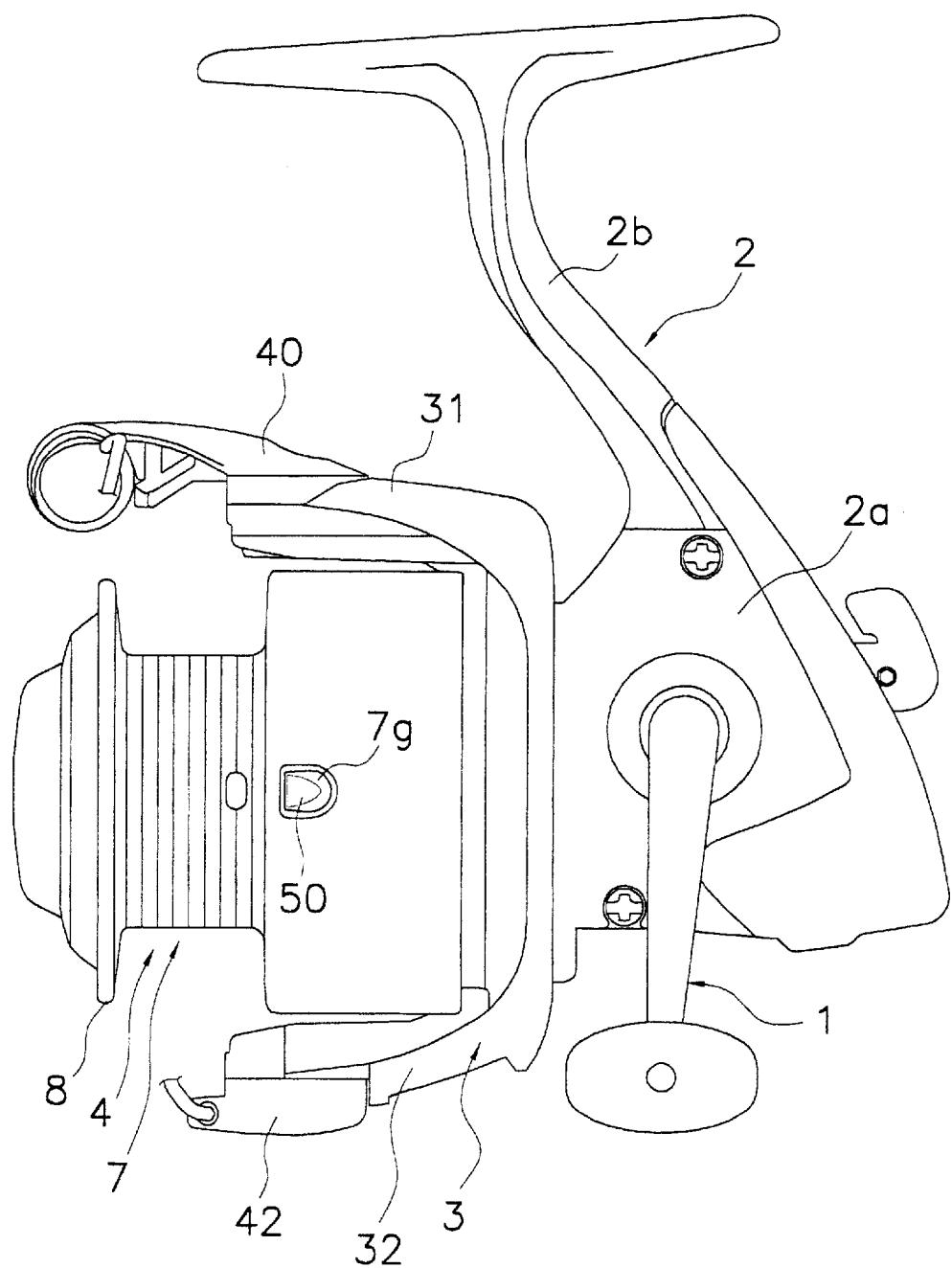
FIG. 1 is a left side view of a spinning reel according to one embodiment of the present invention.

A spinning reel in which one embodiment of the present invention is adopted is a front-drag model, and is furnished with, as shown in FIG. 1: a reel unit 2 that rotatively carries a handle 1; a rotor 3; and a spool 4. The rotor 3 is rotatively carried on the front of the reel unit 2. The spool 4, onto the outer circumferential surface of which fishing line is wound, is arranged on the front of the rotor 3 to be movable back and forth.

The reel unit 2 includes a reel body 2a, and a rod-attachment foot 2b extending diagonally up/frontward from the reel body 2a. The interior of the reel body 2a is a hollow as indicated in FIG. 2, and installed within the hollow are a rotor-drive mechanism 5 that rotates the rotor 3 by linkage to rotation of the handle assembly 1; and an oscillating mechanism 6 that pumps the spool 4 back and forth to wind fishing line onto the spool 4 uniformly.

The rotor drive mechanism 5 includes a face gear 11 that rotates together with a handle shaft 10 onto which the handle 1 is fastened, and a pinion gear 12 that meshes with the face gear 11. The pinion gear 12 is cylindrically formed, and its front portion passes through the center portion of the rotor 3, where the front portion of the pinion gear 12 is fastened onto the rotor 3 by a nut. The pinion gear 12 is rotatively supported at the axial mid-portion and the axial rear end respectively via bearings 14a, 14b in the reel unit 2.

The oscillating mechanism 6 is a device for causing a spool shaft 15 linked via a drag mechanism 60 to the center portion of the spool 4 to shift in the front-to-rear direction, and thereby to pump the spool 4 in the same direction. The oscillating mechanism 6 has a worm 21 disposed beneath and parallel to the spool shaft 15, a slider 22 that moves in the front-to-rear direction along the worm 21, and an intermediate gear 23 affixed to the fore end of the worm 21. The hind end of the spool shaft 15 is non-rotatably affixed to the slider 22. The intermediate gear 23 meshes with the pinion gear 12 via a (not illustrated) gear-down train.

Figure 2:
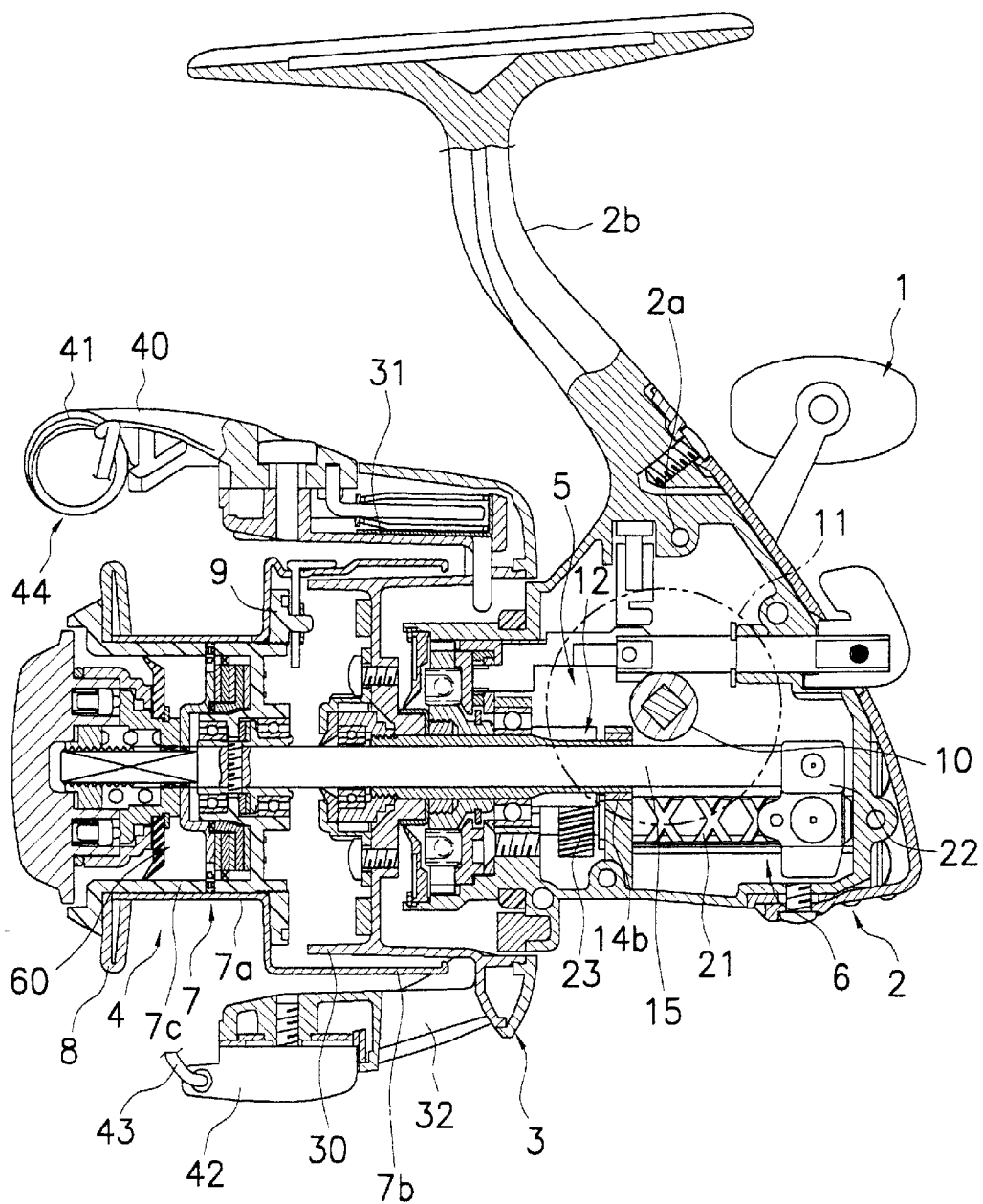
FIG. 2 is a left side cross-sectional view of the aforementioned spinning reel.

The rotor 3, as shown in FIG. 2, includes a round cylinder portion 30; and first and second rotor arms 31, 32 opposing each other furnished sideways on the round cylinder portion 30. The round cylinder portion 30 and the two rotor arms 31, 32 are, e.g., aluminum-alloy manufactured, and formed unitarily.

The first rotor arm 31 curving in an outward bulge extends frontward from the round cylinder portion 30, and the part joined with the round cylinder portion 30 is curved broadening in the circumferential direction of the round cylinder portion 30. A first bail-support member 40 is fitted pivotally onto the outer peripheral side of the fore end of the first rotor arm 31. A line roller 41 for guiding fishing line onto the spool 4 is fitted to the fore end of the first bail-support member 40.

The second rotor arm 32 curving in an outward bulge extends frontward from the round cylinder portion 30. Heading from its tip toward the area where it joins with the round cylinder portion 30, the second rotor arm 32 branches into two legs, which are connected with the round cylinder portion 30 in two places spaced at a circumferential interval. A second bail-support member 42 is fitted pivotably onto the outer peripheral side of the fore end of the second rotor arm 32.

A bail 43 of wire bent into a roughly U-shaped contour is fastened in between the line roller 41 and the second bail-support member 42. These first and second bail-support members 40, 42, the line roller 41, and the bail 43 compose a bail arm 44 that guides fishing line onto the spool 4. The bail arm 44 is pivotable in between a line-guiding posture, indicated in FIG. 2, and reversed from that into a line-releasing posture.

The spool 4 is arranged in between the first rotor arm 31 and the second rotor arm 32 on the rotor 3, and is fitted via the drag mechanism 60 onto the fore end of the spool shaft 15. The spool 4 includes, as shown enlarged in FIG. 3: a spool body 7; a large-diameter front flange 8 attached to the front end of a bobbin trunk 7a; and a nut member 9 for fastening the front flange 8 to the spool body 7. The spool body 7 includes: the bobbin trunk portion 7a, outer-circumferentially onto which fishing line is wound; a large-diameter cylindrical skirt portion 7b formed integrally with the bobbin trunk portion 7a on its rear end; and an inner barrel member 7c attached to the inner peripheral side of the bobbin trunk portion 7a.

The bobbin trunk portion 7a and the skirt portion 7b are a large-and-small, dual-stage cylindrical member formed unitarily and obtained by press-working aluminum-alloy sheet metal. The bobbin trunk portion 7a is a cylindrical component onto the outer periphery of which fishing line is wound. A through-hole 7f (see FIGS. 1 and 3) for receiving a knot at the wind-starting end of the fishing line is formed in the bobbin trunk portion 7a in one location nearby the skirt portion 7b.

Figure 3:
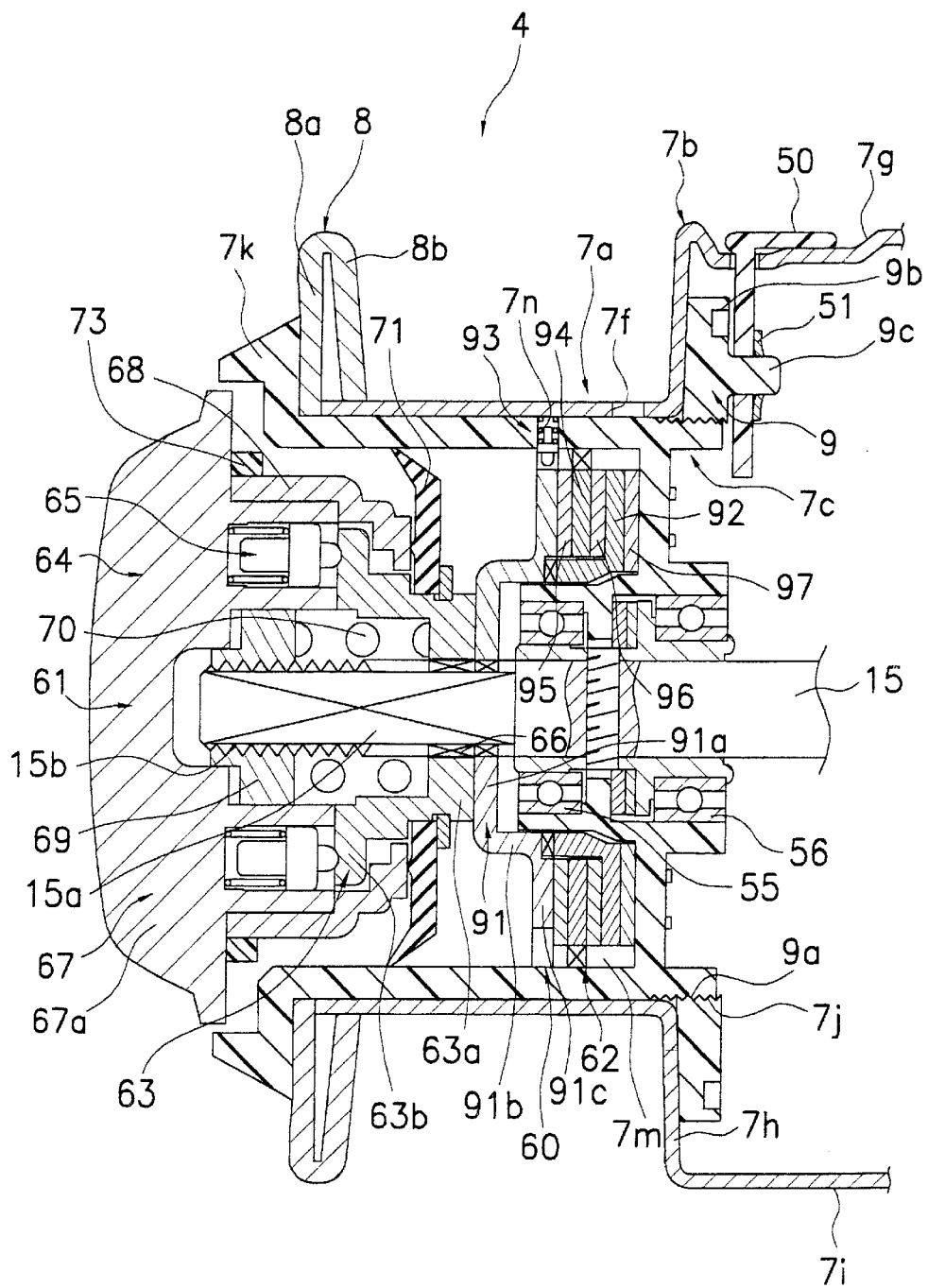
FIG. 3 is an enlarged sectional view of the spool from the aforementioned spinning reel.

The skirt portion 7b includes a rear flange 7h extending radially outward from the rear end of the bobbin trunk portion 7a, and a round cylindrical portion 7i extending rearward from the outer periphery of the rear flange 7h. A stepped recess 7g is formed, as indicated in FIGS. 1 and 3, in the round cylindrical portion 7i; and a fishing-line lock 50 for locking the fore-end part of the fishing line is fitted into the recess 7g. A gap for clipping the fishing line is created in between the recess 7g and the fishing-line lock 50.

The inner barrel member 7c, attached to the inner peripheral side of the bobbin trunk portion 7a, is a synthetic-resin manufactured cylindrical component on the inner periphery of which the drag mechanism 60 is fitted. A male-threaded portion 7j onto which the nut member 9 screws is formed on the rear end of the inner barrel member 7c, to jut out from the bobbin trunk portion 7a. A large-diameter brim portion 7k, by which the front-end face of the bobbin trunk portion 7a is locked, is formed on the front end of the inner barrel member 7c. The brim portion 7k is provided to vise, between the brim portion 7k and the front-end face of the bobbin trunk portion 7a, and thereby fasten, the front flange 8. A later-described drag sounding mechanism 93 that issues sound through action of the drag mechanism 60 is fitted into the inner barrel member 7c. A pair of front/rear bearings 55, 56 is fitted along an inner peripheral side of the inner barrel member 7c; the inner barrel member 7c is mounted rotatively on the spool shaft 15 through the bearings 55, 56.

The front flange 8, an annular component manufactured from, e.g., an aluminum alloy, includes a front ring portion 8a and a rear ring portion 8b. A curling process has been carried out on the front flange 8 so that the two ring portions 8a, 8b are folded over along their outer periphery. The inner diameter of the front ring portion 8a is about the same as the outer diameter of the inner barrel member 7c; and the inner diameter of the rear ring portion 8b is about the same as the outer diameter of the bobbin trunk portion 7a. The front face of the front ring portion 8a is formed for adhering close to the brim portion 7k. The front flange 8 is held in between the brim portion 7k and the front-end face of the bobbin trunk portion 7a, and fastened to the inner barrel member 7c, by screwing the nut member 9 onto the male-threaded portion 7j.

The nut member 9, in the center of which is formed a female-threaded portion 9a that screw-joins with the male-threaded portion 7j, is a ring component having the elasticity of synthetic resin manufacture. A tool-interlock portion 9b for interlocking with a special tool for turning the nut member 9 is formed in the rear face of the nut member 9. Here, the fishing-line lock 50, an elastically deformable component roughly T-shaped in lateral cross-section as shown in FIG. 3, is mounted on a nib 9c formed projecting on the rear end of the nut member 9, and is fastened by a pushnut 51 fitted over the tip of the nib 9c.

In assembling the thus-configured spool 4, the front flange 8 is fitted onto the inner barrel member 7c, over which the bobbin trunk portion 7a is further fitted. In this state, the fishing-line lock 50 is fitted and fastened onto the nut member 9; and by rotating the inner barrel member 7c with respect to the nut member 9, the male-threaded portion 7j is screwed into the nut member 9, fastening the bobbin trunk portion 7a and the front flange 8 to the inner barrel member 7c. Herein, the fact that the front flange 8 is fastened using the male-threaded portion 7j formed on the rear end of the inner barrel member 7c makes it so that a lightened spool 4 may be devised, while securing sufficient interior space therein.

The drag mechanism 60 is mounted between the spool 4 and the spool shaft 15, and is a device for applying drag force to the spool 4. The drag mechanism 60 has, as shown in FIG. 3: a knob unit 61 for adjusting the drag force by hand; and a friction unit 62 made up of a plurality of disks that are pressed toward the spool 4 by means of the knob unit 61.

Parallel chamfers 15a are formed on the front of the spool shaft 15, and a male-threaded portion 15b is formed on the fore end of the portion with the chamfers 15a. The knob unit 61 includes: a first component 63 installed non-rotatably yet axially movably on the chamfers 15a; a second component 64 disposed axially frontward of the first component 63 and screwed onto the spool shaft 15; and a sounding mechanism 65, fitted in between the first component 63 and the second component 64.

The first component 63 is a round cylindrical member having a brim, and includes a cylinder portion 63a and a ring-shaped brim portion 63b larger in diameter than the cylinder portion 63a. A flat-sided keyway 66 into which the spool shaft 15 non-rotatably interlocks is formed in the inner margin of the cylinder portion 63a. The rear end face on the cylinder portion 63a of the first component 63 abuts on the friction unit 62. A sealing washer 71 for preventing liquids from invading toward the friction unit 62 from outside is fitted between the cylinder portion 63a of the first component 63 and, the inner circumferential surface of the inner barrel member 7c. The sealing washer 71 has a lip on the outer periphery, and is obtained, e.g., by outsert-molding a plate-shaped elastic element made of NBR onto the circumferential perimeter of a ring element made of stainless steel.

The second component 64 is installed opposing the first component 63, while being rotatable relative to the first component 63. The second component 64 includes: a knob body 67 disposed aligned frontward of the first component 63 in the spool shaft 15 direction; and the cover member 68, whose fore end is fixed to the outer periphery of the knob body 67. The first component 63 is relatively rotatively housed in the interior of the knob body 67.

The knob body 67 is a saucer-shaped component, the front surface of which forms a forward-projecting, roughly trapezoidal knob 67a. A nut 69 that screws onto the male-threaded portion 15b at the tip of the spool shaft 15 is fitted non-rotatably yet axially movably in the interior of the knob body 67. Further, a coil spring 70 is disposed in the compressed state about the outer periphery of the spool shaft 15 in the interval between the first component 63 and the nut 69.

An O-ring 73 rectangular in cross-section is fitted in between the knob body 67 and the fore end of the cover member 68. The O-ring 73 is an elastic element made, e.g., of NBR, and is provided in order to prevent liquids from invading the interior through the clearance between the first component 63 and the knob body 67 of the second component 64. If liquids invade through this clearance, even though the sealing washer 71 is installed, the liquids could invade via the clearance between the first component 63 and the spool shaft 15 and as far as the friction unit 62. As a result, the friction portion 62 might then get wet, altering the drag force.

Figure 4:
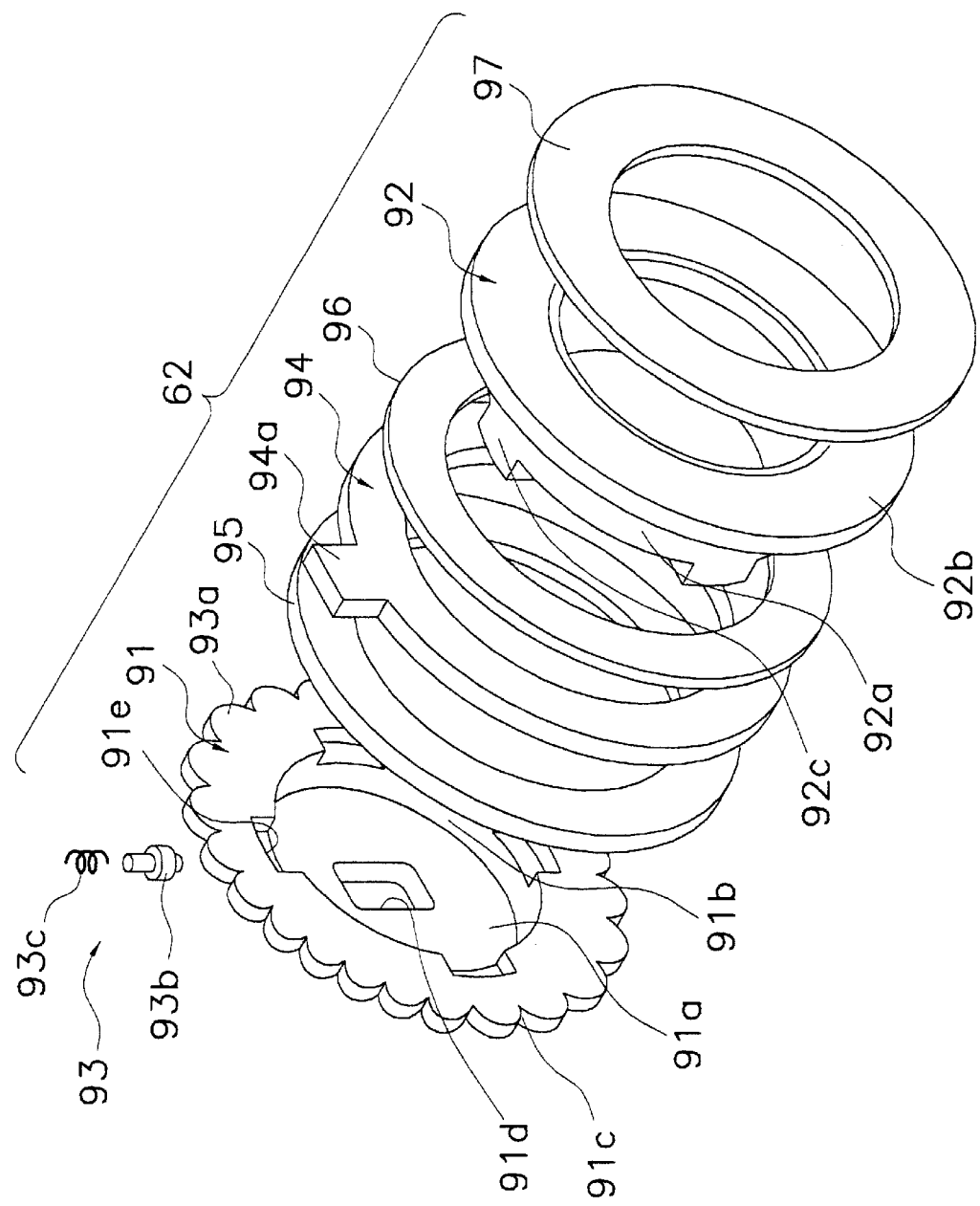
FIG. 4 is an exploded perspective view of the drag mechanism.

The friction unit 62 includes, as shown in FIGS. 3 and 4: a first disk 91 that contacts the first component 63; a second disk 92 non-rotatably interlocked with the first disk; a third disk 94 arranged in between the first disk 91 and the second disk 92; and the drag sounding mechanism 93, fitted to the first disk 91.

The first disk 91 has: an inner disk portion 91a that contacts the first component 63; a circular cylinder portion 91b that extends rearward from the circumferential periphery of the inner disk portion 91a; and an outer disk portion 91c that extends rearward from the rear end of the circular cylinder portion 91b, along the outer periphery of the center portion of the inner barrel member 7c. The first disk 91 is fitted non-rotatably yet axially movably to the spool shaft 15 by interlocking a roughly rectangular interlocking hole 91d formed in the center of the inner disk portion 91a with the chamfers 15a. Further, scallops 93a that are a component of the drag sounding mechanism 93 are formed on the outer disk portion 91c. Four, for example, round arcuate recesses 91e are formed spaced at circumferential intervals on the inner peripheral margin of the back face of the first-disk 91 outer disk portion 91c.

The second disk 92, a round cylindrical component with a brim, has a cylinder portion 92a and a brim portion 92b. The cylinder portion 92a is disposed encompassing the center portion of the inner barrel member 7c, and fitted free to rotate on the center portion. Four tongues 92c are formed spaced at circumferential intervals, projecting from the fore end of the cylinder portion 92a. The tongues 92c interlock into the round arcuate recesses 91e. The second disk 92 is thereby interlocked non-rotatably into the first disk 91. Accordingly, the second disk 92 is also non-rotatable with respect to the spool shaft 15.

The third disk 94 is fitted rotatively about the outer peripheral surface of the cylinder portion 92a of the second disk 92. On its circumferential perimeter, the third disk 94 has a pair of interlock tongues 94a (only one is illustrated) that project diametrically outward. The interlock tongues 94a interlock into interlock grooves 7m formed in the inner peripheral surface of the inner barrel member 7c. The third disk 94 is thereby rotatable with respect to the spool shaft, yet is non-rotatable with respect to the spool 4.

The drag sounding mechanism 93 includes: the scallops 93a formed in the outer circumferential surface of the first disk 91; a sound-emitting pin 93b fitted in the inner barrel member 7c to let it shift radially so that its tip collides with the scallops 93a; and a coil spring 93c that urges the sound-emitting pin 93b toward the scallops 93a. The sound-emitting pin 93b and the coil spring 93c, being installed in the inner barrel member 7c, are accommodated in a through-hole 7n closed off by the bobbin trunk portion 7a. In this drag sounding mechanism 93, during drag operation, i.e., when the spool 4 rotates with respect to the spool shaft 15, the sound-emitting pin 93b, urged by the coil spring 93c, repeatedly collides with the scallops 93a, issuing sound.

Drag disks 95, 96, 97 made of graphite or felt are, respectively, fitted: between the first disk 91 and the third disk 94, between the third disk 94 and the second disk 92, and between the second disk 92 and the inner barrel member 7c.

Reel Handling and Operation

With this spinning reel, when the line is to be reeled out during casting or the like, the bail arm 44 is flipped over into the line-releasing posture. Consequently, the fishing line is reeled out successively from the leading-edge side of the spool 4 by the terminal tackle under its own weight.

During line retrieval, the bail arm 44 is returned into the line-retrieving posture. This automatically takes place by the operation of a not-illustrated bail-flipping mechanism when the handle 1 is rotated in the line-retrieving direction. The torque of the handle 1 is transmitted to the pinion gear 12 via the handle shaft 10 and the face gear 11. The torque transmitted to the pinion gear 12 is transmitted from its front portion 12a to the rotor 3, and meanwhile is transmitted via the gear-down train to the oscillating mechanism 6 by the intermediate gear 23 that meshes with the pinion gear 12. Consequently, along with the rotor 3 rotating in the line-retrieving direction, the spool 4 pumps back and forth.

When a fish is caught on the terminal tackle, at times under the tug of the fish the drag mechanism 60 will operate as the spool 4 reverses. While the drag is operating, because the first disk 91 and the third disk 94 are immovable with respect to the spool shaft 15, and the second disk 92 is immovable with respect to the spool 4, rubbing occurs, via the drag disks 95–97, in between the first and third disks 91, 94 and the second disk 92 and the spool 4. The drag force at that time is determined by the pressing force of the first component 63 on the first disk 91, which is set by turning the knob 67a of the knob unit 61.

Second Embodiment

A spool in a front-drag type of spinning reel was illustrated as an example in the first embodiment, but the present invention may also be applied to spools in rear-drag and lever-drag types of spinning reels.

Figure 5:
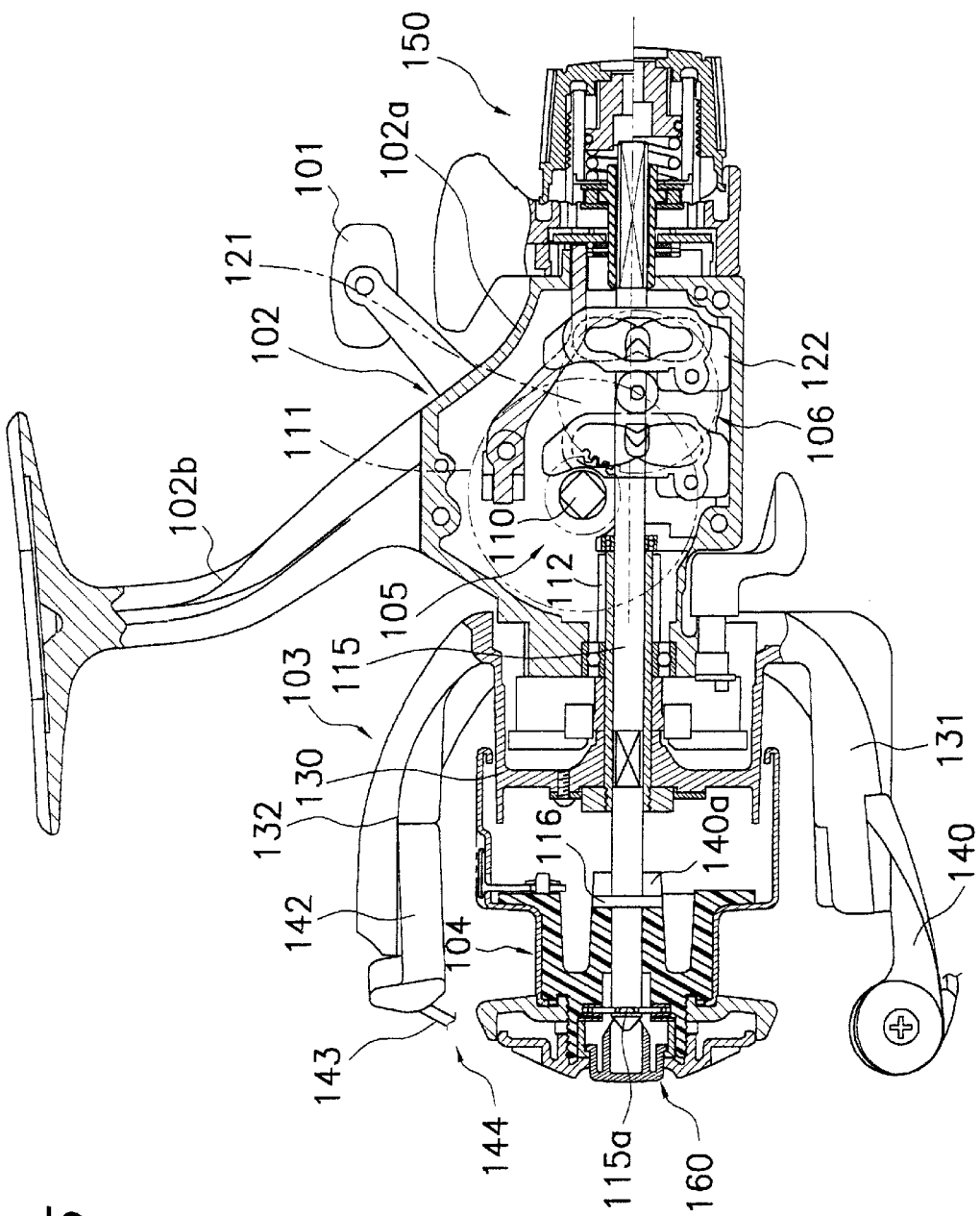
FIG. 5 is a left side cross-sectional view of the spinning reel spool in accordance with the second embodiment, corresponding to FIG. 2.

A rear-drag type of spinning reel in which a second embodiment of the present invention is adopted, as shown in FIG. 5 is furnished with: a reel unit 102 that rotatively carries a handle 101; a rotor 103; and a spool 104. The rotor 103 is rotatively carried on the front of the reel unit 102. The spool 104, onto the outer circumferential surface of which fishing line is wound, is arranged on the front of the rotor 103 to allow it to move back and forth.

The reel unit 102 includes a reel body 102a, and a rod-attachment foot 102b extending diagonally up/frontward from the reel body 102a. In the interior of the reel body 102a is a hollow, and installed within the hollow are a rotor-drive mechanism 105 that rotates the rotor 103 by linkage to rotation of the handle assembly 101; and an oscillating mechanism 106 that pumps the spool 104 back and forth to wind fishing line onto it uniformly. Further, a rear drag mechanism 150 is installed at the rear of the reel unit 102.

The rotor drive mechanism 105 includes a face gear 111 that rotates together with a handle shaft 101 onto which the handle 101 is fastened, and a pinion gear 112 that meshes with the face gear 111. The pinion gear 112 is cylindrically formed, and its front portion passes through the center portion of the rotor 103, where it is fastened onto the rotor 103 by a nut. The pinion gear 112 is rotatively supported at the mid-portion and rear end in the axial direction via respective bearings in the reel unit 102.

The oscillating mechanism 106 is a device for causing a spool shaft 115, which extends front-to-rear and on the fore end of which the spool 104 is connected, to shift in the front-to-rear direction, and for causing the spool 4 to pump in the same direction. The oscillating mechanism 106 is a gear-down model, and includes a gear member 121 that rotates in linkage with the face gear 111, and a slider 122 that reciprocates in the spool-axial in linkage with the gear member 121. The slider 122 is allowed to rotate but is axially immovable with respect to the spool shaft 115. The slider 122 is guided by the reel body 102a so that it moves parallel with the spool shaft 115.

The rear drag mechanism 150 is connected non-rotatably yet axially movably to the rear end of the spool shaft 115. The rear drag mechanism 150 is for braking, via the spool shaft 115, rotation of the spool 104 in the line reel-out direction.

The rotor 103 includes a round cylinder portion 130; and first and second rotor arms 131, 132 opposing each other furnished sideways on the round cylinder portion 130. The round cylinder portion 130 and the two rotor arms 131, 132 are made of e.g., aluminum-alloy, and are formed unitarily.

The first rotor arm 131 curving in an outward bulge extends frontward from the round cylinder portion 130, and the part joined with the round cylinder portion 130 is curved broadening in the circumferential direction of the round cylinder portion 130. A first bail-support member 140 is fitted pivotally onto the outer peripheral side of the fore end of the first rotor arm 131. A line roller (not illustrated) for guiding fishing line onto the spool 104 is fitted to the fore end of the first bail-support member 140.

The second rotor arm 132 curving in an outward bulge extends frontward from the round cylinder portion 130. Heading from its tip toward the area where it joins with the round cylinder portion 130, the second rotor arm 132 branches into two legs, which are connected with the round cylinder portion 130 in two places spaced at a circumferential interval. A second bail-support member 142 is fitted pivotally onto the outer peripheral side of the fore end of the second rotor arm 132.

A bail 143 of wire bent into a roughly U-shaped contour is fastened in between the line roller and the second bail-support member 142. These first and second bail-support members 140, 142, the line roller, and the bail 143 compose a bail arm 144 that guides fishing line onto the spool 104. The bail arm 144 is pivotable in between a line-guiding posture, indicated in FIG. 5, and reversed from that into a line-releasing posture.

The spool 104 is arranged in between the first rotor arm 131 and the second rotor arm 132 on the rotor 103, is fitted detachably and reattachably onto the spool shaft 115 by means of a detach/reattach mechanism 160, and is non-rotatably locked by a pin 116. The pin 116 is fitted into the spool shaft 115 along its diametric direction, and is interlocked into an interlocking groove 104a formed in the spool 104.

Figure 6:
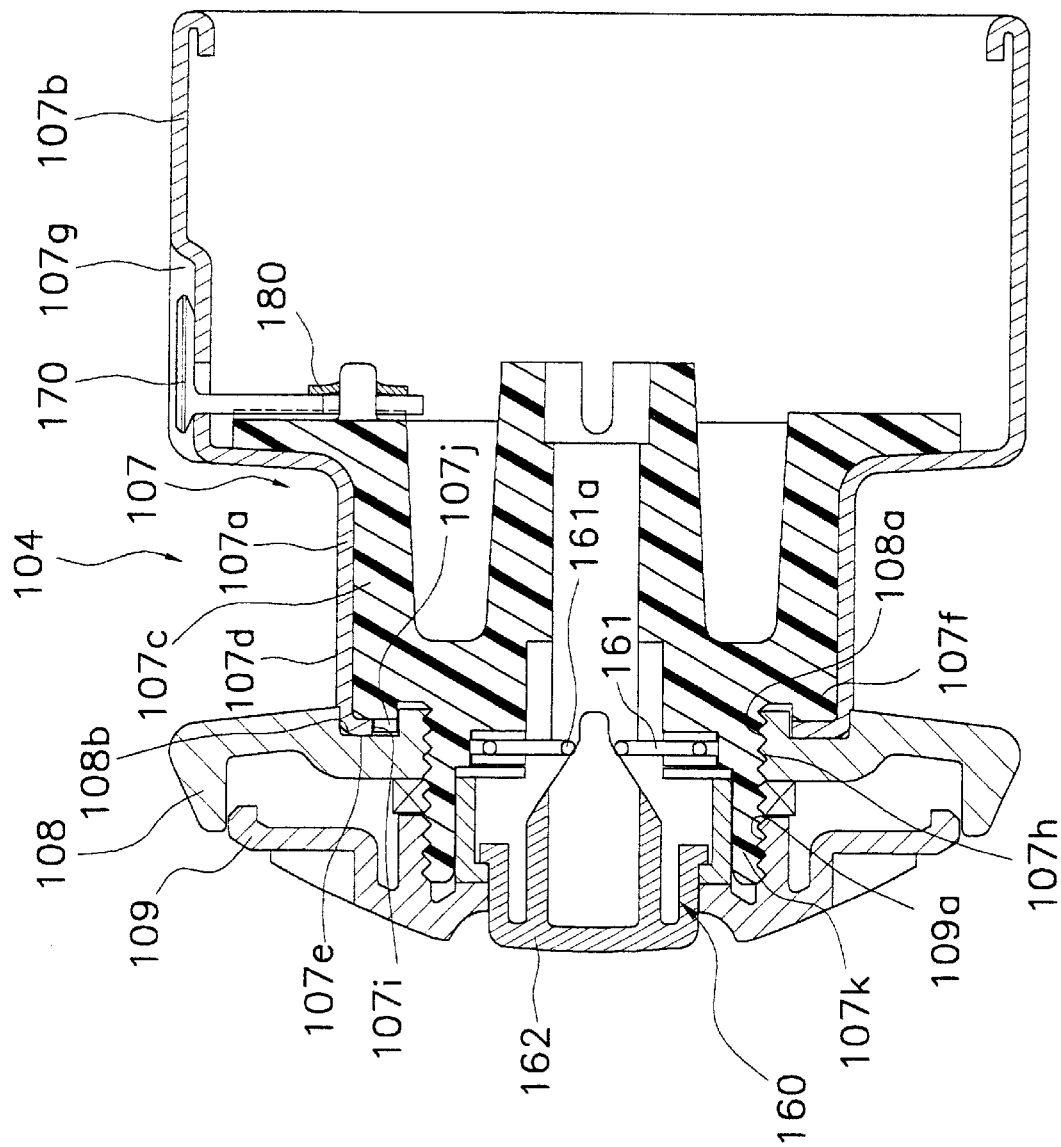
FIG. 6 is an enlarged sectional view of the spool in accordance with the second embodiment, corresponding to FIG. 3.

The spool 104 includes, as shown enlarged in FIG. 6: a spool body 107; a large-diameter front flange 108 attached to the front end of a bobbin trunk portion 107a; and a flange-fastening member 109 for stopping the front flange 108 against turning. The spool body 107 includes: a bobbin trunk portion 107a, outer-circumferentially onto which fishing line is wound; a large-diameter cylindrical skirt portion 107b formed integrally with the bobbin trunk portion 107a on its rear end; and an inner barrel member 107c attached to the inner peripheral side of the bobbin trunk portion 107a.

The bobbin trunk portion 107a and the skirt portion 107b are a large-and-small, dual-stage cylindrical member formed unitarily and obtained by press-working aluminum-alloy sheet metal. A machining process is carried out on their outer peripheral surface with a lathe in order to present a classic feel; and an advanced-precision machining process is further carried out on the outer circumferential surface onto which the front flange 108 is fitted, in order that a gap does not occur between the circumferential surface and the front flange 108.

The bobbin trunk portion 107a includes a cylindrical portion 107d outer peripherally onto which fishing line is wound, and an inner flange portion 107e formed integrally with the cylindrical portion 107d on its front end. The inner flange portion 107e is press-worked to fold over inward so that it contacts on the front end of the inner barrel member 107c. The inner flange portion 107e is vised in between the inner barrel member 107c front end and the front flange 108. Further, an engaging notch 107i is provided in a single location on the inner periphery of the inner flange portion 107e, for stopping the bobbin trunk portion 107a against turning with respect to the inner barrel member 107c.

A stepped recess 107g is formed in the skirt portion 107b; and a fishing-line lock 170 for locking the fore-end part of the fishing line is fitted into the recess 107g. A gap for clipping the fishing line is created in between the recess 107g and the fishing-line lock 170. Here, the fishing-line lock 170, an elastically deformable component roughly T-shaped in lateral cross-section, is fastened by a pushnut 180 fitted over a nib formed on the rear end of the inner barrel member 107c.

The inner barrel member 107c is attached to the inner peripheral side of the bobbin trunk portion 107a, and is a synthetic-resin-manufactured cylindrical component—into the front end of which a detach/reattach mechanism 160 is fitted. The inner barrel member 107c is fitted non-rotatably to the spool shaft 115 by means of the pin 116. The fishing-line lock 170 is attached to the rear end of the inner barrel member 107c. An annular protrusion 107f is formed along the outer rim of the front end of the inner barrel member 107c, projecting beyond the rest; and an engaged projection 107j onto which the engaging notch 107i formed in the inner flange portion 107e engages is formed in a single location in the front edge of the annular protrusion 107f. Further, a cylindrical projection 107k having a male-threaded portion 107h, onto which screw-join later-described first and second female-threaded portions 108a, 109a formed on the front flange 108 and the flange-fastening member 109, is formed peripherally inward on the front-end of the inner barrel member 107c.

The front flange 108 is an annular, synthetic-resin-manufactured component whose surface is treated with hard plating, and is formed so that its slightly forward-sloping outer peripheral edge is bent over. The first female-threaded portion 108a is formed on the inner periphery of the front flange 108. Further, an annular groove 108b into which the inner flange portion 107e and the annular protrusion 107f on the inner barrel member 107c are inserted is formed on the rear face of the front flange 108 where it opposes the inner flange portion 107e.

The front flange 108 is fastened to the inner barrel member 107c by screwing the first female-threaded portion 108a onto the male-threaded portion 107h on the inner barrel member 107c. In this situation, the inner flange portion 107e and the annular protrusion 107f are inserted into the annular groove 108b, holding the inner flange portion 107e between in between the inner barrel member 107c and the annular groove 108b. Consequently, the bobbin trunk portion 107a fitted onto the inner barrel member 107c is fastened in a state in which it is stopped against turning on the inner barrel member 107c.

The flange-fastening member 109 is a flange-shaped component formed to have a rearward-sloping front face, and the second female-threaded portion 109a is formed in the peripherally inward hind portion. The flange-fastening member 109 is screwed onto and fastened to the inner barrel member 107c by screw-joining the second female-threaded portion 109a onto the male-threaded portion 107h on the inner barrel member 107c. The flange-fastening member 109 and the front flange 108 form a double nut, and simultaneously thereby the flange-fastening member 109 can be fastened, and looseness in the front flange 108 can be stopped.

The detach/reattach mechanism 160 has a spring element 161 fitted in the interior of the cylindrical projection 107k, and a detach/reattach button 162 that works the spring element 161 to expand/contract. The spring element 161 has an interlocking portion 161a that interlocks with an interlock groove 115a (FIG. 5) formed in the fore end of the spool shaft 115. The detach/reattach button 162 is shiftable in the axial direction, and is urged in its jutting-out direction by the spring element 161. Likewise, it is locked by the flange-fastening member 109 so as not to fly off in the jutting-out direction. The spool 104 may be taken off the spool shaft 115 by press-manipulating the detach/reattach button 162 to open out the interlocking portion 161a and remove the interlocking portion 161a from the interlock groove 115a.

With a spool 104 like this, the fact that an inner flange 107e, which is the front rim portion of the bobbin trunk portion 107a bent over peripherally inward, is formed integrally with the bobbin trunk portion 107a sustains high strength in the bobbin trunk portion 107a. Moreover, the fact that the inner flange 107e is inserted into the annular groove 108b formed in the front flange 108 means that the inner flange 107e is unlikely to deform, which further sustains its strength at a high level. Likewise, the fact that the part of the bobbin trunk portion 107a that is devised for higher strength, onto which the front flange 108 is fitted, is machined to a high degree of precision, makes line-gnaw yet less likely. Further still, the fact that in the spool 104 also, the front flange 108 is fastened using the male-threaded portion 107h formed on the front end of the inner barrel member 107c makes it so that the spool 104 may be devised lightened in weight while securing sufficient interior space therein.

Other Embodiments (a) In the foregoing embodiments, the inner barrel members 7c, 107c were synthetic resin manufactures, but the inner barrel member material is not thereby limited; they may be manufactured from a light metal alloy such as aluminum. Likewise, the front flange 8 was an aluminum alloy manufacture, but may be made of a separate metal such as a stainless alloy or a titanium alloy, or may be made of a ceramic such as zirconium.

(b) The front flange 108 is screwed directly onto the male-threaded portion 107h in the foregoing second embodiment, which otherwise may be such that the front flange 108 is fastened to the inner barrel member 107c by forming a through-hole in the front flange 108 through which the male-threaded portion 107h can be passed, and screwing the flange-fastening member 109 onto the male-threaded portion 107h.

Figure 7:
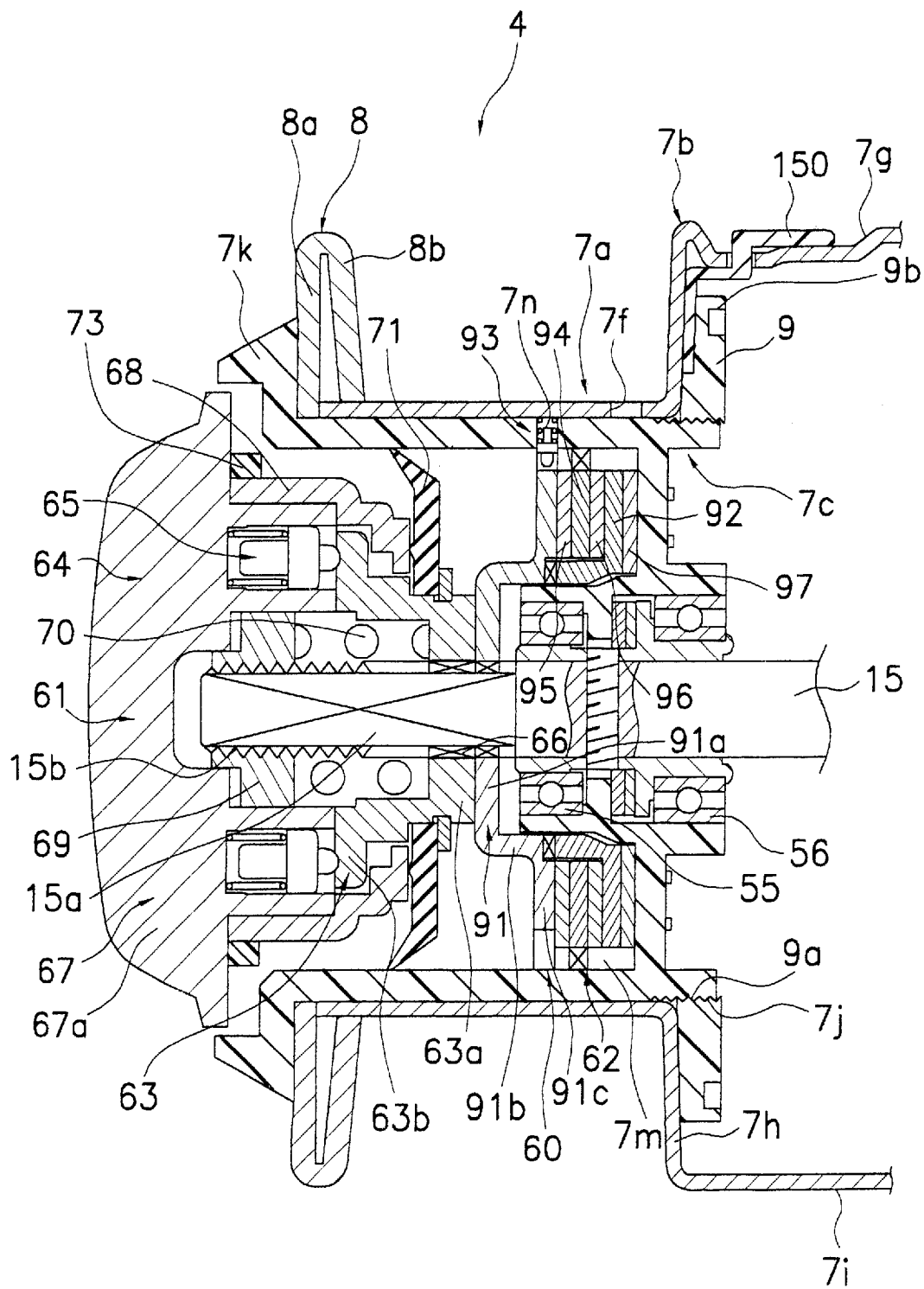
FIG. 7 is an enlarged sectional view of the spool in accordance with still another embodiment, corresponding to FIG. 3.

(c) The fishing-line lock 50 is fitted and fastened onto the nut member 9 by the pushnut 51 fitted over the nib 9c in the foregoing first embodiment, which otherwise may be such that, as shown in FIG. 7, fishing-line lock 150 is fitted and fastened by sandwiching a portion of it in between the nut member 9 and the rear flange 7h on the skirt portion 7b. In this case, the fishing-line lock 150 may be simply and securely locked utilizing the elasticity of the nut member 9.

(d) In the foregoing first embodiment, the nut member 9 was synthetic-resin made, but the nut member 9 material may be another material, such as metal or wood.

Figure 8:
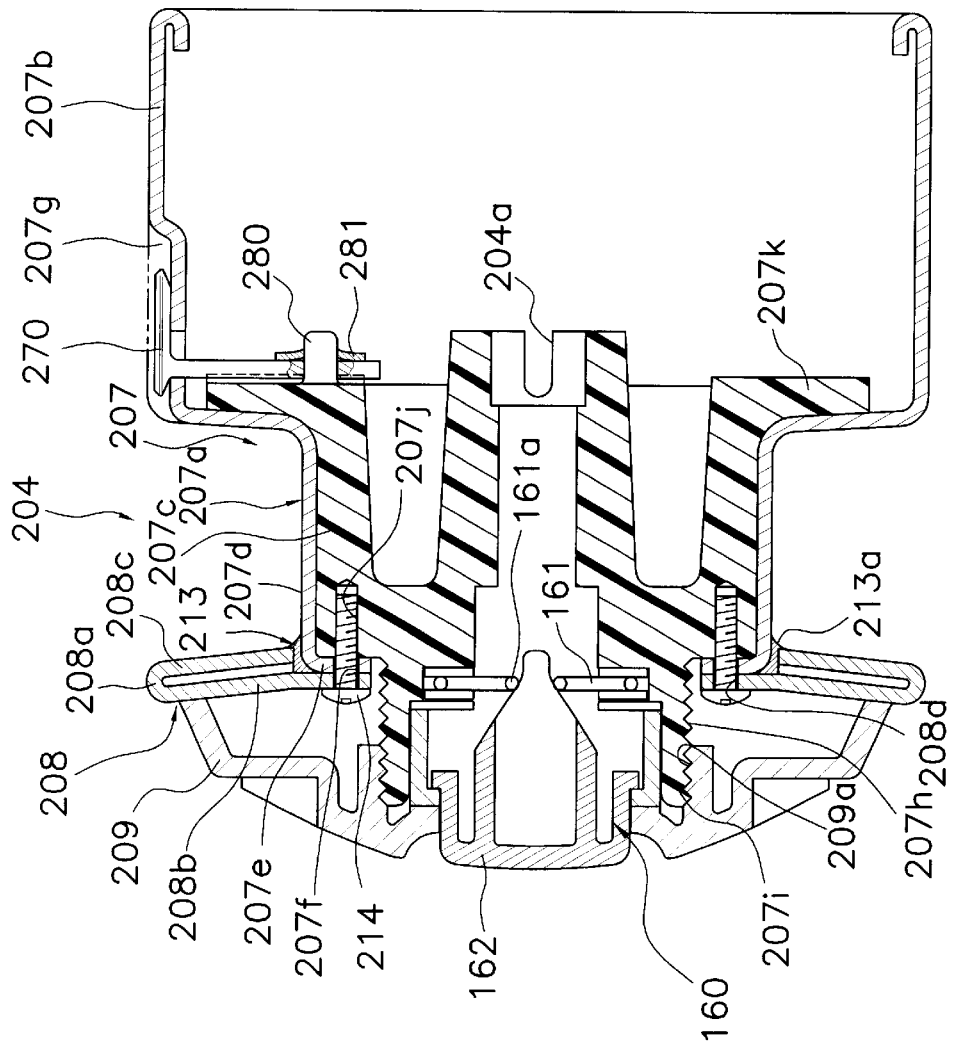
FIG. 8 is an enlarged sectional view of the spool in accordance with still another embodiment, corresponding to FIG. 3.

(e) As shown in FIG. 8, a line-intrusion prevention member 213 may be fitted in a gap between a bobbin trunk portion 207a and a front flange portion 208.

The spool 204 includes, as shown enlarged in FIG. 8: a spool body 207; a large-diameter front flange 208 attached to the front end of a bobbin trunk portion 207a; and a flange-fastening member 209 arranged in front of the front flange 208. The spool body 207 includes: the cylindrical bobbin trunk portion 207a, outer-circumferentially onto which fishing line is wound; a large-diameter cylindrical skirt portion 207b formed integrally with the bobbin trunk portion 207a on its rear end; and an inner barrel member 207c attached to the inner peripheral side of the bobbin trunk portion 207a.

The bobbin trunk portion 207a and the skirt portion 207b are a large-and-small, dual-stage cylindrical member formed unitarily and obtained by press-working aluminum-alloy sheet metal. A machining process is carried out on their outer peripheral surface with a lathe in order to present an appearance having a classic feel; and a line-intrusion prevention element 213 is fitted on the outer circumferential surface onto which the front flange 208 is mounted, in order that a gap does not occur between the circumferential surface and the front flange 208.

The bobbin trunk portion 207a includes a cylindrical portion 207d outer peripherally onto which fishing line is wound, and an inner flange portion 207e formed integrally with the cylindrical portion 207d on its front end. The inner flange portion 207e is press-worked to fold over inward so that it contacts on the front end of the inner barrel member 207c. The inner flange portion 207e is held in between the inner-barrel-member 207c front end and the front flange 208. Four through-holes 207f through which pass four, for example, fastening bolts 214 for mounting are formed spaced at circumferential intervals in the inner flange portion 207e.

A stepped recess 207g is formed in the skirt portion 207b; and a fishing-line lock 270 for locking the fore-end part of the fishing line is fitted into the recess 207g. A gap for clipping the fishing line is created in between the recess 207g and the fishing-line lock 270.

The inner barrel member 207c is attached to the inner peripheral side of the bobbin trunk portion 207a, and is a synthetic-resin-manufactured cylindrical component—into the front end of which the detach/reattach mechanism 160 is fitted. The inner barrel member 207c is fitted non-rotatably to the spool shaft 115 by means of the pin 116 (FIG. 5). A cylindrical projection 207i having a male-threaded portion 207h is formed peripherally inward on the front end of the inner barrel member 207c. A later-described female-threaded portion 209a formed on the flange-fastening member 209 screw-joins onto the male-threaded portion 207h. Four screw-holes 207j into which the fastening bolts 214 screw are formed spaced at circumferential intervals peripherally outward of the cylindrical projection 207i on the inner barrel member 207c. A brim portion 207k that flares peripherally outward along the rear of the bobbin trunk portion 207a is formed on the rear end of the inner barrel member 207c, and the fishing-line lock 270 is attached to the brim portion 207k. Here, the fishing-line lock 270 is an elastically deformable component roughly T-shaped in lateral cross-section. The fishing-line lock 270 is mounted a nib 280 formed projecting on the rear-end face of the inner barrel member 207c, and is fastened by a pushnut 281 fitted over the tip of the nib 280.

The front flange 208 is a component having a crook portion 208a bent over to the bobbin trunk portion 207a. The crook portion 208a is formed by curling, e.g., a sheet of metal such as aluminum. The outer peripheral margin of the front flange 208 inclines a bit frontward, and has a front portion 208b and a back portion 208c, with the crook portion 208a as a boundary. The front portion 208b of the front flange 208 extends radially inward to a location where it opposes the front face of the inner barrel member 207c and the inner flange portion 207e of the bobbin trunk portion 207a. Four, for example, through-holes 208d through which the fastening bolts 214 pass are formed spaced at circumferential intervals in locations in the front portion 208b opposite the screw-holes 207j. The inner peripheral surface of the back portion 208c is situated to leave a predetermined gap with the outer circumferential surface of the bobbin trunk portion 207a. The line-intrusion prevention element 213 is fitted into this gap.

The fastening bolts 214 pass through the through-holes 208d, 207f and are screwed into the screw-holes 207j, thereby fastening the front flange 208 and the bobbin trunk portion 207a together onto the inner barrel member 207c. The line-intrusion prevention element 213 is a cylindrical component manufactured of a synthetic resin, and is for preventing fishing line being intruded in the gap between the front flange 208 and the bobbin trunk portion 207a. The line-pinch prevention element 213 is fitted in the gap where the joining surfaces of the bobbin trunk portion 207a and the front flange 208 are outwardly exposed. The line-intrusion prevention element 213 has a jut 213a that smoothly connects the rear face of the back portion 208c of the flange 208, and the outer circumferential surface of the bobbin trunk portion 207a. Further, the fore-rim of the line-intrusion prevention element 213 extends radially inward along the arched surface formed curving into the inner flange portion 207e at the fore end of the bobbin trunk portion 207a.

Providing a line-intrusion prevention element 213 as such closes off the gap in between the inner peripheral surface of the back portion 8c of the flange 208—where it is comparatively hard to produce precision—on which the crook portion 208a is formed by curling, and the bobbin trunk portion 207a, lets line-intrusion be prevented without machining the inner peripheral surface of the back portion 208c of the flange 208. Likewise, the fact that the jut 213a smoothly connects the rear face of the back portion 208c, and the outer circumferential surface of the bobbin trunk portion 207a means that line-intrusion is even less apt to occur, which reliably prevents line-intrusion.

The flange-fastening member 209 is a flange-shaped component formed to have an outer-periphery front face that slopes rearward, and the female-threaded portion 209a is formed in the peripherally inward hind portion. The flange-fastening member 209 is screwed onto and fastened to the inner barrel member 207c by screw-joining the female-threaded portion 209a onto the male-threaded portion 207h on the inner barrel member 207c. The outer periphery of the flange-fastening member 209 abuts on the front portion 208b of the front flange 208, whereby the front flange 208 is slightly pressed. Along with fastening the front flange 208, this accordingly stops looseness in the flange-fastening member 209.

In a spool 204 thus configured, a line-intrusion prevention element 213 is fitted in the gap where the joining surfaces of the bobbin trunk portion 207a and the front flange 208 are outwardly exposed. The fact that due to the line-intrusion prevention element 213 a gap between the front flange 208 and the bobbin trunk portion 207a is therefore not created allows intrusion of the fishing line to be prevented. Likewise, the line-intrusion prevention element 213 being provided in between the front flange 208 and the bobbin trunk portion 207a makes it unnecessary to fabricate the sections for the fit between the bobbin trunk portion 207a and the front flange 208 with a high degree of precision, and therefore the two may be formed readily and at low cost. Moreover, the fact that an inner flange portion 207e that is the front end bent over inward is formed integrally with the bobbin trunk portion 207a allows the strength of the bobbin trunk portion 207a to be kept high.

Figure 9:
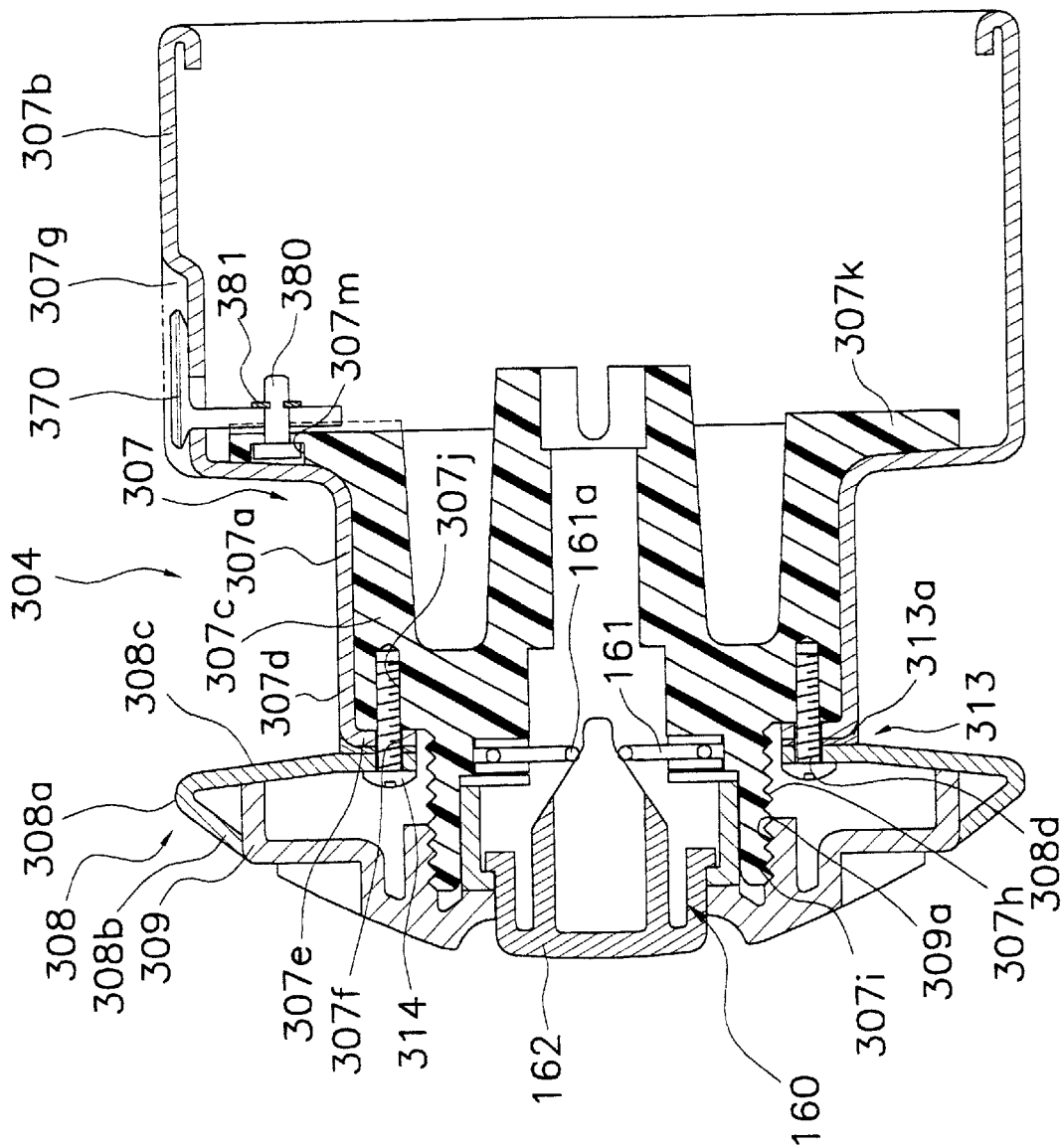
FIG. 9 is an enlarged sectional view of the spool in accordance with still another embodiment, corresponding to FIG. 3.

(f) In the foregoing embodiment (e), the front flange 208 has a crook portion 208a that is folded over rearward (toward the bobbin trunk portion 207a), but as shown in FIG. 9, a front flange 308 may have a crook portion 308a that is bent over frontward. In this case, the front portion 308b of the front flange 308 extends to a location where it contacts the outer periphery of the flange-fastening member 309. Likewise, the back portion 308c extends peripherally inward to a location where it opposes the inner flange portion 307e of the bobbin trunk 307a and the front face of the inner barrel member 307c. To do away with the gap in between the back portion 308c and the inner flange portion 307e, a line-intrusion prevention member 313 is fitted into the gap.

The line-intrusion prevention member 313, a ring-shaped element made of material such as metal, has a lip 313a encompassing the rear face, which smoothly connects with the arched outer surface of the front-end rim of the bobbin trunk portion 307a.

Here, in this embodiment, the fishing-line lock 370 is fitted to the inner barrel member 307c by a stepped rod 380 attached to the brim portion 307k of the inner barrel member 307c. The stepped rod 380 is mounted in a stepped hole 307m formed in the brim portion 307k, and a snap ring 381 is fit over the tip of the stepped rod 380. The fishing-line lock 370 is fastened to the inner barrel member 307c by means of the snap ring 381. Attaching the fishing-line lock 370 in this way mounts the fishing-line lock 370 securely even in the situation where the thickness of the brim portion 307k of the inner barrel member 307c is thinned and there is no room to spare for attaching the fishing-line lock 370.

(g) In the foregoing embodiment, a front flange 8, 108, 208, 308 formed with a crook portion by curling on a base material made of sheet metal was illustrated, but the method of fabricating the crook portion is not thereby limited, nor is the shape thereby limited. Likewise, the front flange 8, 108, 208, 308 may be a metal manufacture, or may be a non-metal, such as a synthetic-resin or ceramic, manufacture.

EFFECTS OF INVENTION

In the present invention, the fact that the male-threaded portion is formed on an inner barrel member attached to the inner peripheral side of a sheet-metal-manufactured bobbin trunk, and the front flange is fastened using the male-threaded portion, makes it so that the spool may be devised lightened in weight while securing sufficient interior space.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A spool for use in a spinning reel for shifting back and forth with respect to a reel body of the spinning reel, a frontward direction being a direction away from the reel body, a rearward direction being a direction toward the reel body, said spool including:
    a bobbin trunk portion formed from sheet metal, a fishing line being adapted to be wound about an outer circumference of said bobbin trunk;
    an inner barrel member installed inner-peripherally along said bobbin trunk, and having a male-threaded portion on its end;
    a front flange portion provided on a front end of said bobbin trunk, said front flange portion being coupled to said inner barrel member via said male-threaded portion; and
    a skirt portion having a diameter larger than a diameter of said bobbin trunk, said skirt portion being provided on a rear end of said bobbin trunk.

2. The spool set forth in claim 1, wherein said male-threaded portion is formed on a rear end of said inner barrel member, said male-threaded portion projecting rearward beyond said bobbin trunk portion.

3. The spool set forth in claim 2, further comprising:
    a large-diameter brim portion provided on a front end of said inner barrel member, said brim portion being capable of locking said front flange portion; and
    a nut member having a female-threaded portion for screw-joining onto said male-threaded portion,
    said skirt portion having a rear flange portion that extends radially outward from the rear end of said bobbin trunk, and a round cylindrical portion extending rearward from an outer periphery of the rear flange portion, said nut member being disposed against said rear flange portion such that said front flange portion is held between said brim portion and bobbin trunk portion by screw-joining said female-threaded portion onto said male-threaded portion,
    said front flange portion having a through-hole through which an outer circumferential surface of said inner barrel member can pass.

4. The spool set forth in claim 3, wherein said nut member is made of synthetic resin.

5. The spool set forth in claim 1, wherein said male-threaded portion is formed on an inner periphery relative to the front end of said inner barrel member, so as to project frontward beyond said bobbin trunk portion.

6. The spool set forth in claim 5, wherein said bobbin trunk has a cylindrical portion, and an inner flange portion formed integrally with said cylindrical portion and extending radially inward along a front end of said inner barrel member.

7. The spinning-reel spool set forth in claim 6, wherein said front flange portion has a first female-threaded portion for screw-joining onto said male-threaded portion, and is coupled to said inner barrel member by screw-joining said first female-threaded portion to said male-threaded portion.

8. (Currently Amended) The spinning-reel spool set forth in claim 7, further comprising
    a flange-fastening member disposed adjacent said front flange portion, said flange-fastening member having a second female-threaded portion for screw-joining onto said male-threaded portion, such that the screw-joining of said second female-threaded portion onto said male-threaded portion couples said front flange portion to said inner barrel member.

9. The spool set forth in claim 7, wherein said front flange portion and said inner barrel member sandwich said inner flange portion and fix said bobbin trunk to said inner barrel member when said first female-threaded portion is screw-joined onto said male-threaded portion.

10. The spool set forth in claim 5, further comprising
    a flange-fastening member having a female-threaded portion for screw-joining onto said male-threaded portion,
    said front flange portion having a through-hole for passing said male-threaded portion,
    said flange-fastening member and said inner barrel member sandwich and fix said front flange portion when said female-threaded portion is screw-joined onto said male-threaded portion.

11. The spool set forth in claim 6, wherein said front flange portion has an annular groove formed opposing said inner flange portion, and said inner flange portion is inserted into said annular groove.

12. The spinning-reel spool set forth in claim 11, wherein:
    an annular protrusion is formed on a part of said inner barrel member where said inner flange portion is disposed, said annular protrusion projecting frontward, and
    said annular protrusion is inserted into said annular groove.

13. The spool set forth in claim 1, wherein said inner barrel member is made of synthetic resin.

14. The spool set forth in claim 1, wherein
said bobbin trunk portion is formed integrally with said skirt portion by press-forming the sheet metal.

15. The spool set forth in claim 1, further comprising
a line-intrusion prevention member, fitted in a gap formed between said bobbin trunk portion and a joining surface of said front flange portion that is outwardly exposed.

16. The spool set forth in claim 15, wherein
said line-intrusion prevention member is a ring element made of synthetic resin.

17. The spool set forth in claim 15, wherein
said front flange portion has a first portion, a crook portion, and a second portion, said crook portion connecting said first and second portions, said front flange portion being coupled to said inner barrel member at said first portion and bent at said crook portion; and
said line-intrusion prevention member is installed in between an outer circumferential surface of said bobbin trunk portion and an inner periphery of said second portion.

18. The spool set forth in claim 17, wherein
said line-intrusion prevention member is formed such that a contour of an exposed surface of said second portion of said front flange portion is smoothly connected to the outer circumferential surface of said bobbin trunk portion.

19. The spool set forth in any of claims 15, wherein
said bobbin trunk portion has a cylindrical portion, and an inner flange portion formed integrally with said cylindrical portion and extending radially inward along a front end of said inner barrel member; and
said line-intrusion prevention member is installed in between said front flange portion and said inner flange portion.

20. The spool set forth in claim 3, further comprising
a fishing line lock for locking an end of the fishing line held between said rear flange portion and said nut member.

\* \* \* \* \*